March 12, 1946.  J. T. BOLAS ET AL  2,396,488
MILLING OR LIKE MACHINE
Filed May 27, 1944  4 Sheets-Sheet 1
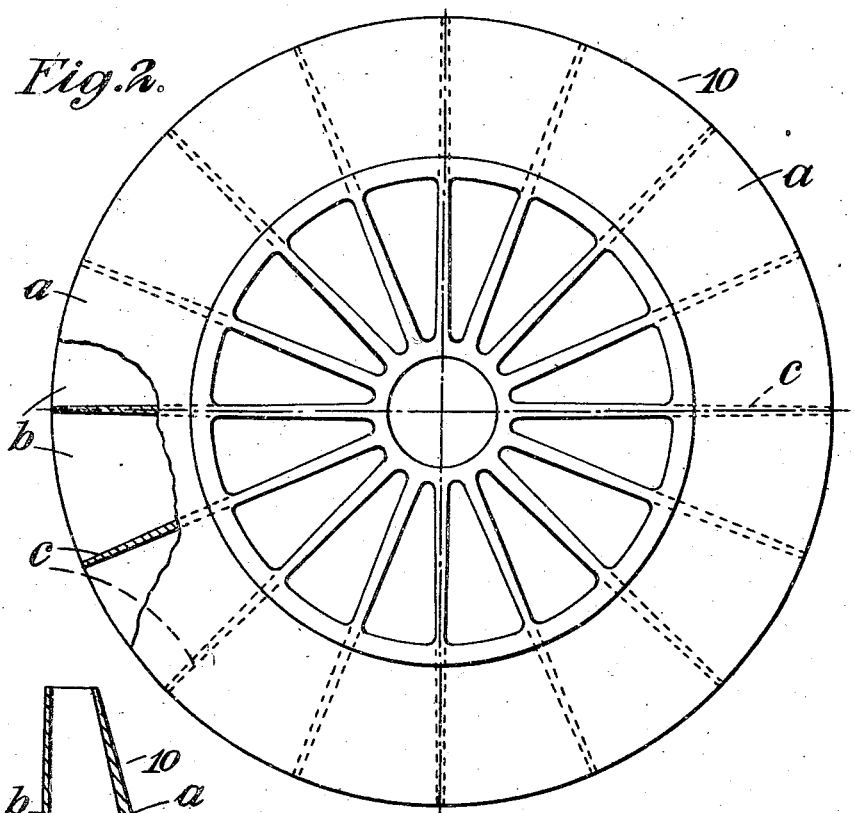
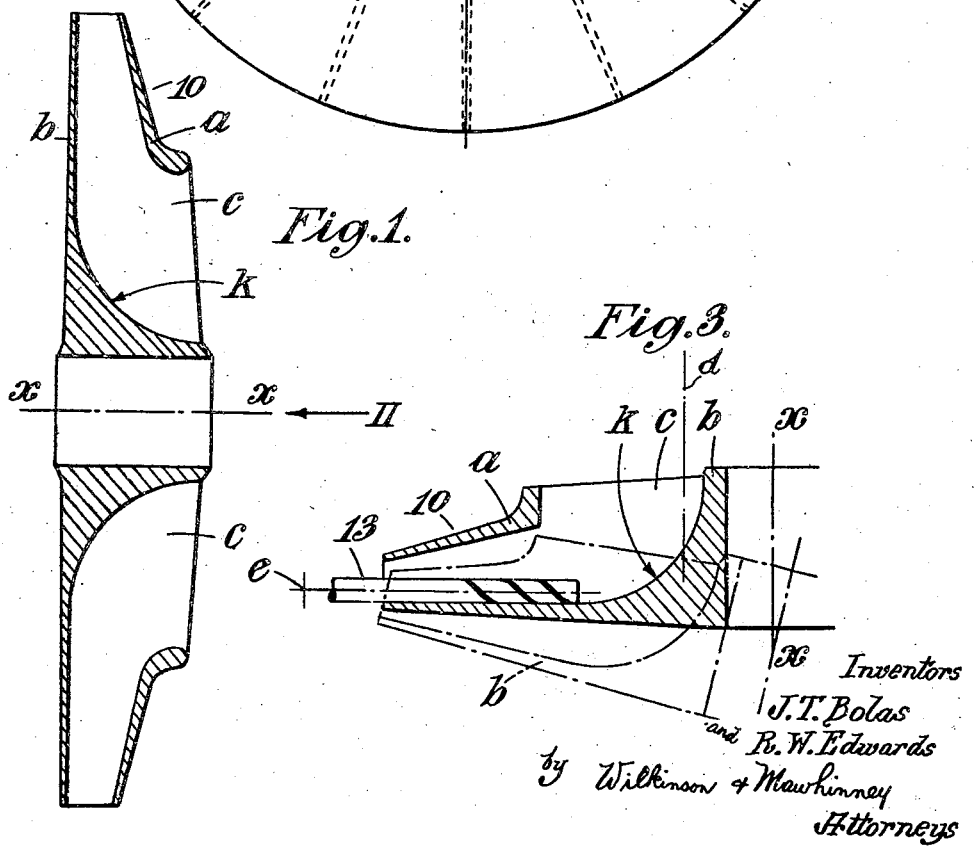
Inventors
J. T. Bolas
and R. W. Edwards
by Wilkinson & Mawhinney
Attorneys Inventors
J. T. Bolas
R. W. Edwards
by Wilkinson & Mawhinney
Attorneys

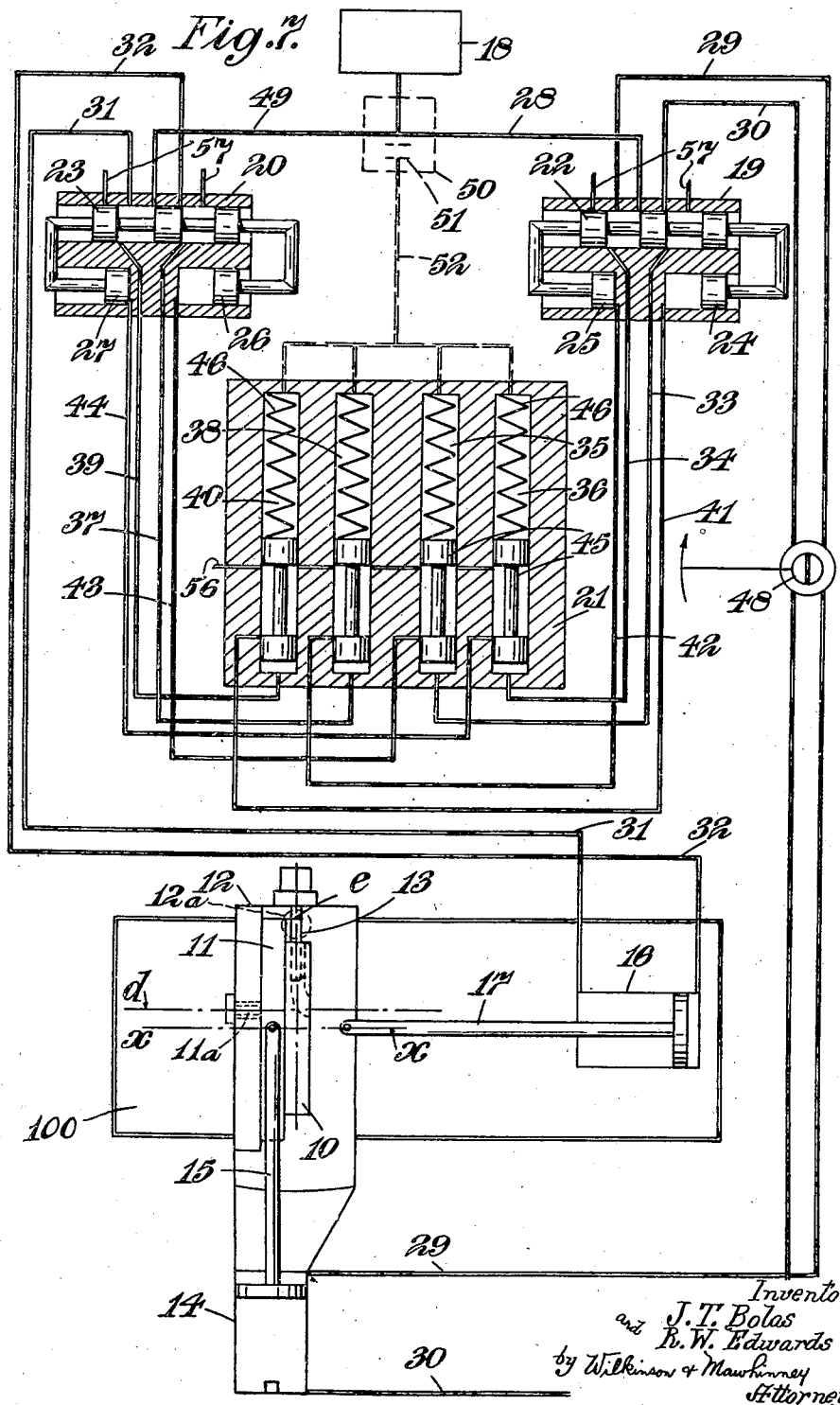

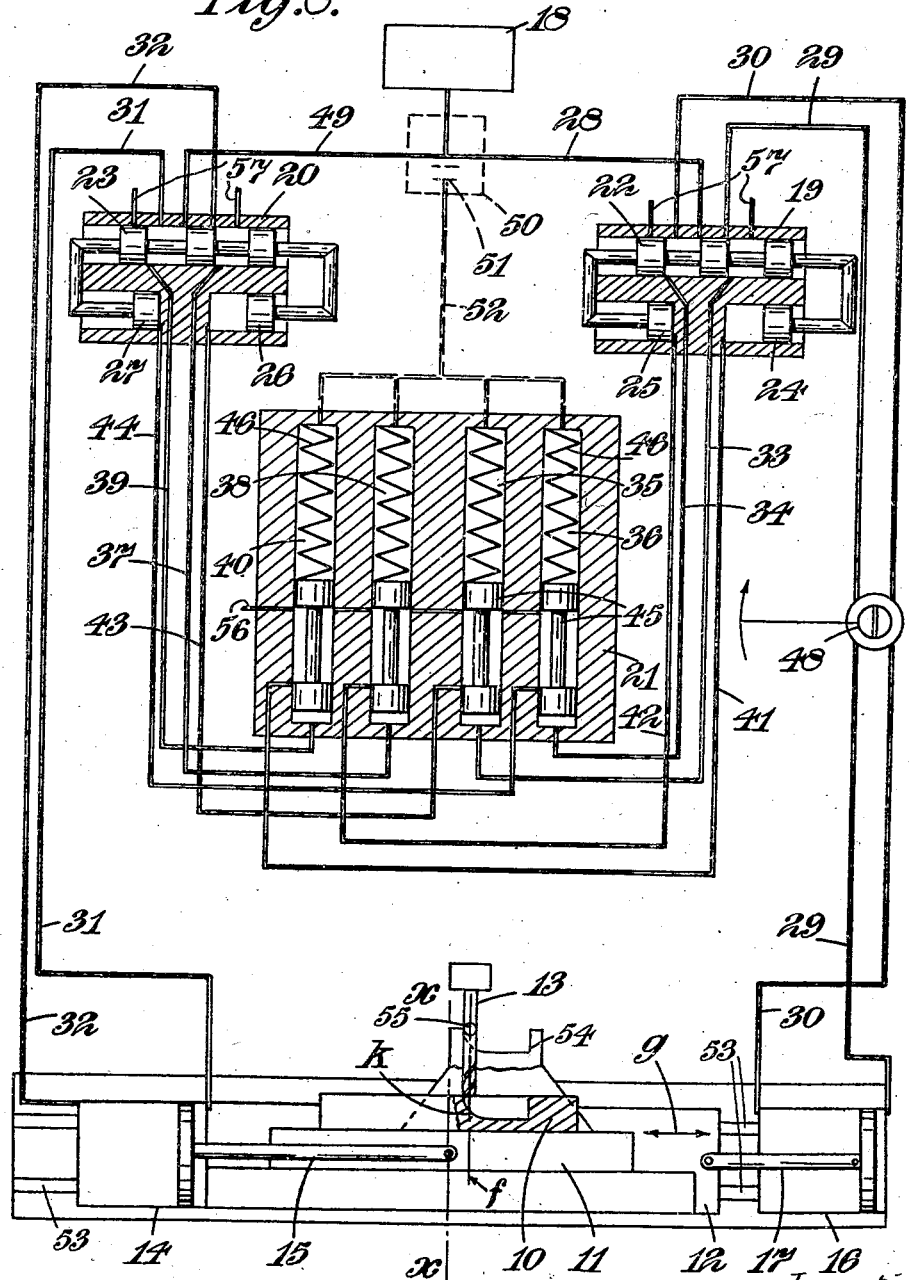

Patented Mar. 12, 1946

2,396,488

UNITED STATES PATENT OFFICE 2,396,488

MILLING OR LIKE MACHINE

John Thomas Bolas and Raymond William Edwards, Bristol, England, assignors to The Bristol Aeroplane Company, Limited, Bristol, England, a British company Application May 27, 1944, Serial No. 537,696
In Great Britain May 20, 1943

6 Claims. (Cl. 90—13.4)

This invention concerns milling or like machines of the kind in which a cutter is advanced towards the work so that it penetrates the work and is also moved relatively to the work successively in more than one direction. The object of the invention is to provide a machine of this kind in which the successive relative movements between the cutter and the work are automatically and rapidly brought into being.

According to the present invention a milling or like machine of the kind described comprises a fluid motor for moving the cutter, a stop for limiting such relative movement, and a valve means for controlling the operation of the fluid motor, the arrangement being that the engagement of said stop by the movement of the cutter results in a pressure fluid increase which actuates said valve means whereby the fluid motor produces a movement of the cutter in the direction successive to that which has resulted in the engagement of said stop.

Although reference is made to a movement of the cutter, it is to be understood that this is a movement relative to the work. The cutter may in certain cases be stationary and the work may be moved.

According to another feature of the invention said cutter movement is limited by the engagement of a pattern (whose shape is to be reproduced by the cutter) and a feeler which is traversed with respect to the pattern.

Where the depth to which the cutter penetrates the work varies over the surface of the work said pattern and feeler may limit the movement of the cutter relatively to the work in this direction also.

A specific embodiment of the present invention will now be described merely by way of example with reference to the accompanying drawings which show an application of the invention to a machine for milling the impeller of a centrifugal supercharger. In the drawings:

Figure 1 is a sectional elevation of such an impeller,

Figure 2 is a view in the direction of the arrow II of Figure 1,

Figure 4:
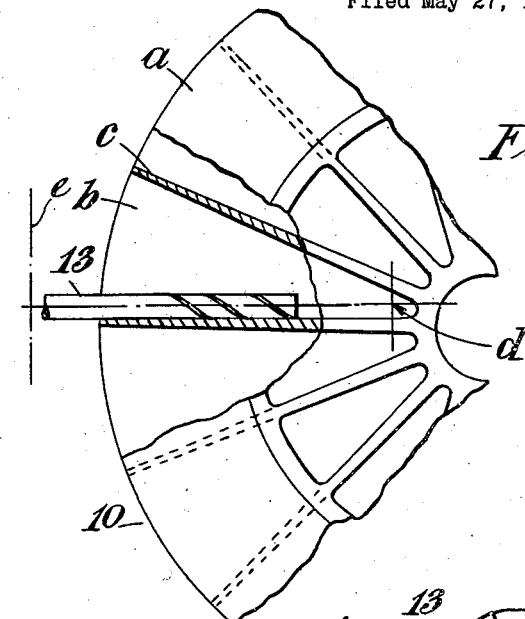
Figure 5:
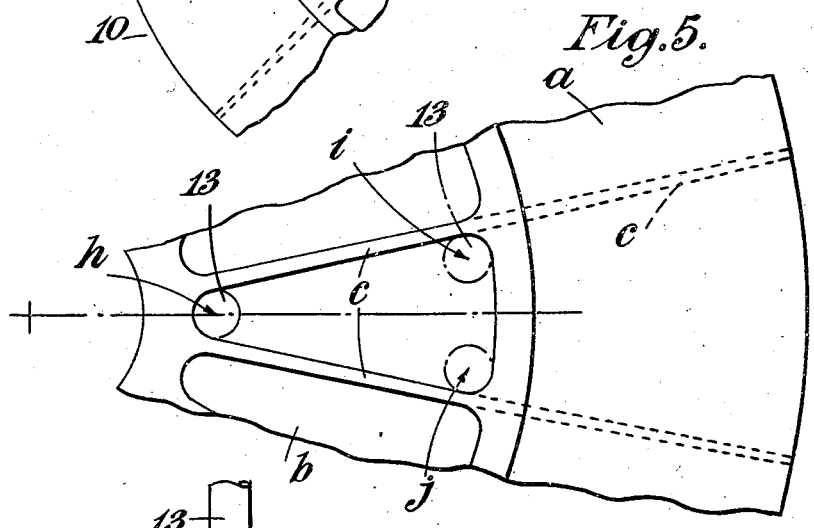
Figure 6:
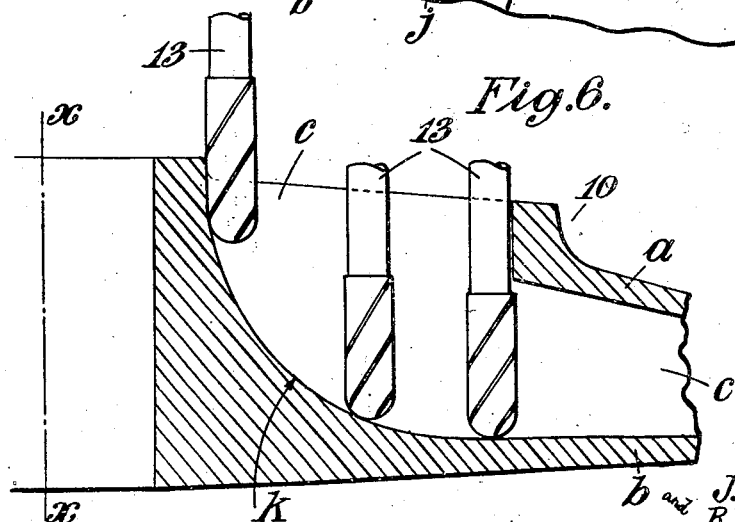

Figures 3 and 4 are diagrammatic views showing the relative disposition of the cutter and impeller during the first part of the machining operation, Figures 5 and 6 are similar views to Figures 3 and 4 showing the relationship of the cutter and impeller during the second part of the machining operation, Figure 7 is a diagrammatic representation of a machine for performing the first part of the machining operation, and Figure 8 is a diagrammatic representation of a machine for performing the second part of the machining operation.

With reference to Figures 1 and 2, it will be noted that the impeller 10 comprises a front shroud $a$, a back shroud $b$ and a plurality of radial blades $c$.

The milling machine which is about to be described has been constructed to enable the funnel-like spaces between the adjacent blades $c$ to be machined from a forging so that the impeller is in one piece. In order to machine any one such inter-blade space it is necessary to perform two machining operations. The first of these is concerned with removing the metal between the periphery of the impeller and a line approximately coincidental with the inner edge of the front shroud $a$. Hereinafter this part of the inter-blade space will be referred to as the outer pocket. The second machining operation is concerned with producing the triangular inner portion of the inter-blade space and this is referred to hereinafter as the inner pocket.

To produce the outer pocket the impeller is mounted so that it is capable of an oscillating movement about axis $d$ (perpendicular to the plane of the paper in Figure 4) and is also capable of a swinging movement about axis $e$ (Figure 3). The cutter, which is of the end and side cutting type, is maintained stationary with its long axis in a somewhat radial direction relative to the impeller. The work is slowly and continuously fed towards the cutter so that the cutter gradually penetrates towards the centre of the impeller. Whilst this in-feed movement is taking place the impeller is also oscillating about $d$ and swinging about $e$. The sequence of operation during machining of the outer pocket is as follows:

Let it be assumed that the cutter is in the position shown in Figure 4 and is in engagement with the back shroud $b$ as is shown in Figure 3. The impeller is oscillated in an anti-clockwise direction about axis $d$ so that the cutter is moved over the face of the back shroud until it reaches the blade $c$ which defines the pocket being machined. At this point a limiting stop is engaged and the oscillating movement of the impeller is changed to a swinging movement about axis $e$ so that the cutter is moved over the face of blade $c$ until it is brought into engagement with the front shroud $a$. This condition is shown in chain-dotted lines in Figure 3. A further limiting stop is now engaged and the swinging movement is replaced by an oscillating movement which moves the cutter over the face of the shroud $a$ the oscillating movement taking place in a clockwise direction. This oscillating movement is terminated by the engagement of a limiting stop when the cutter engages the face of the other blade $c$ which defines the pocket being machined. The cutter is moved over the face of this blade by a swinging movement which brings the cutter back to its initial position. The sequence of operations is then repeated.

During this sequence of operations the feed movement previously referred to is continuously proceeding so that the cutter is gradually advanced as it moves over the faces of the shrouds and blades. At the periphery of the impeller, the diameter of the cutter is such that the waste metal is entirely removed from the outer pocket. At the inner end of the pocket, however, the increased depth of the impeller makes it necessary for the cutter to take trepanning cuts with the result that a wedge-shaped piece of stock remains in the pocket. This is subsequently removed as is described hereinafter.

The second part of the milling operation is performed by advancing the work towards a milling cutter of the end and side cutting type so that the cutter always lies parallel with the axis of rotation of the impeller ($x$—$x$) whilst the latter is successively moved to perform an oscillating motion about axis $f$ and a reciprocating movement in the direction of arrow $g$ (see Figure 8). As a result of these impeller movements the cutter, which commences the second machining operation at $h$ (Figure 5) where it is coaxial with the axis $f$, moves along the face of a blade $c$ which defines one wall of the inner pocket until it reaches point $j$. Engagement of a limiting stop at this point ensures that the cutter ceases its movement in a radial direction relative to the work and is moved in a circumferential direction from $i$ to $j$. At this point another limiting stop is engaged which terminates the circumferential movement of the cutter and replaces it by an inward radial movement along the surface of blade $c$ until it is returned to point $h$. Whilst the impeller is moved so that the cutter traces around the triangular path $h$, $j$, $i$, $h$ relative to the impeller, the latter is also continuously moved towards the cutter, so that the depth of the inner pocket increases during the machining operation.

The base of the wedge-shaped piece of stock which remains in the outer pocket extends to within the machining range of the cutter which performs the second part of the machining operation so that as the cutter advances into the inner pocket the wedge-shaped piece of stock is removed.

A milling machine in accordance with the present invention is capable of performing the two machining operations briefly outlined above. Each operation calls for certain variations in the construction and operation of the machines however, and a description of two machines each of which is specially adapted for performing one such operation now follows.

The machine for performing the first operation is shown in Figure 7. Referring to this figure: the impeller forging is carried by an oscillating table 11 which is mounted by a pivot 11$a$ on a workhead generally indicated at 12. The table 11 is thus capable of oscillating about axis $d$ whilst the workhead 12 as a whole is mounted by a pivot 12$a$ on a base 100 so that it is capable of being swung about axis $e$. The oscillating and swinging motions referred to are those already described with reference to Figures 3 and 4. The cutter 13 is carried by the base 100 and is suitably driven.

In order to oscillate the table 11 a hydraulic motor 14 is mounted on the workhead 12 and is connected to the table 11 at one side thereof by rod 15. Similarly in order to swing the head 12 another hydraulic motor 16 is mounted on the base 100 and is connected to the head by a rod 17.

The rotary cutter 13 is stationary and the in-feed movement is performed by advancing the head 12 (and with it the impeller 10) towards the cutter, for which purpose another hydraulic motor (not shown) is provided. This in-feed movement is continuous in its operation from the time when the cutter engages the peripheral edge of the impeller until it has completed machining the outer pocket whereupon the in-feed is stopped.

The pressure fluid for operating the reciprocating hydraulic motors, 14 and 16 is supplied by a constant delivery pump 18. The pressure fluid from the pump 18 is directed to the motors 14, 16 through valve assemblies 19, 20 respectively. For each hydraulic motor the associated valve assembly directs the pressure fluid to one end or the other of the cylinder, that is, it controls the direction of movement of the piston in the cylinder. Associated with the valve assemblies 19 and 20 is a further valve assembly 21 which houses a plurality of pilot valves. The pilot valve assembly is suitably connected with the assemblies 19, 20 and the general operation of the hydraulic mechanisms is that pressure fluid is supplied by pump 18 selectively to hydraulic motors 14 and 16 through the valve assemblies 19, 20. When the hydraulic motor to which the pump is supplying pressure fluid has completed its stroke this piston is prevented from further movement and since the pump 18 continues to deliver pressure fluid to the system the pressure of the system as a whole rises. As a consequence of this pressure increase the pilot valves of the assembly 21 are brought into operation to set the valve assemblies 19, 20 so that they will direct pressure fluid selectively to the hydraulic motors so that one of them performs the cutting stroke successive to that which has produced the pressure increase.

Each valve assembly 19, 20 comprises a change-over valve 22, 23 and a pair of actuators 24, 25 and 26, 27 respectively.

The pressure fluid from pump 18 passes to valve assembly 19 by pipe 28 and then by pipes 29 or 30 to the hydraulic motor 14 depending upon the position of the change-over valve 22. Similarly the pressure fluid from the pump 18 passes by pipe 49 to the valve assembly 20 and then by pipes 31 or 32 to the hydraulic motor 16 dependent upon the position of the change-over valve 23. The pressure fluid is also capable of passing from pipe 28 through the valve assembly 19 to either of two pipes 33, 34. These pipes lead respectively to pilot valves 35, 36. Thus when the pressure fluid from pipe 28 passes through valve assembly 19 to pipe 30 and the hydraulic motor 14, it also passes by pipe 33 to the pilot valve 35. Similarly when the pressure fluid flows along pipe 28 to pipe 29 and motor 14 it passes by pipe 34 to the pilot valve 36.

The arrangement of pressure fluid supplies to the hydraulic motor 16 and pilot valves 38, 40 is similarly provided for in connection with valve assembly 20. Thus when pressure fluid flows by pipe 49 to the hydraulic motor 16 by pipe 32 it also passes by pipe 37 to pilot valve 38, and when it passes by pipe 31 to motor 16 it also passes by pipe 39 to pilot valve 40.

The actuators 24, 25, 26, and 27 are respectively connected with pilot valve 40, 38, 35 and 36 by means of pipes 41, 42, 43 and 44.

The pilot valves each comprise a plunger 45 and a spring 46 which maintains the plunger in its lower position so that the pressure fluid from change-over valves 22 or 23 is prevented from passing to the actuators 24—27.

The operation of the machine is as follows:

The machining operation is commenced by starting the in-feed so that the workhead 12 and the impeller forging 10 are moved towards the stationary cutter 13 whilst the latter is rotated. When the cutter engages with the periphery of the impeller the machining operation described with reference to Figures 3 and 4 commences. The disposition of the various parts of the machine at this stage is shown in Figure 7. The first cutting operation required is effected by imparting an anti-clockwise oscillation to the impeller 10 by motor 14 (see Figure 4) and this is provided for by passing pressure fluid from pump 18 by pipe 28, valve assembly 19 and pipe 29 to the motor 14. At the same time pressure fluid passes by pipe 34 to pilot valve 36. Meantime in order to maintain the cutter in contact with the back shroud b (which is being machined) pressure fluid also passes from pump 18 by pipe 49, valve assembly 20, pipe 31, to motor 16 to maintain it at the end of its stroke as shown in Figure 7. When the work has been oscillated so that the back shroud b of the outer pocket is completely machined the motor 14 will have completed the limit of its stroke and the piston is prevented from further movement by its engagement with the cylinder. The pump 18 continues to deliver pressure fluid to the system however and the fluid pressure accordingly rises. When the pressure increase has reached a predetermined value pilot valves 36 and 40 will have their plungers raised against the pressure of the springs 46 so that the pressure fluid is enabled to pass by pipes 44 and 41 to the actuators 27 and 24 respectively. As is clear from Figure 7 the piston of actuator 24 is in its extreme right-hand position so that the admission of pressure oil by pipe 41 has no effect in the setting of the various parts of the valve assembly 19. The pressure fluid moving along pipe 44 from pilot valve 36 passes to the actuator 27 and moves the piston of the latter to its extreme left-hand position, the actuator 26 being connected to a drain 56 by the pipe 43 and valve 35. As a consequence the valve 23 is moved from the position shown in Figure 7 so that it assumes the left-hand position.

The conditions now prevailing are that pressure fluid will continue to pass by pipe 28, valve assembly 19 and pipe 29 to the motor 14 so that the latter maintains the first impeller blade associated with the pocket being machined against the cutter 13. The actuation of the change-over valve of assembly 20 has directed pressure fluid from pipe 49 through the assembly and by pipe 32 to the motor 16 so that the latter swings the head 12 about axis e and thus performs the machining operation on the surface of the first impeller blade (see also Figure 3). This operation continues until the piston of motor 16 reaches the limit of its travel, which occurs when the impeller 10 has been moved to bring the cutter 13 against the surface of the front shroud a. The pump 18 will continue to supply pressure fluid to the motors 14, and 16 so that the pressure of the system rises until a predetermined value is reached. The pilot valves 36 and 38 will therefore be opened since this increased pressure of the fluid is communicated to these by pipes 34 and 37.

The opening of pilot valves 36, 38 enables the pressure fluid to pass to actuators 25 and 27. As a consequence, the actuator 25 will be operated to move the change-over valve 22 to its left-hand position whilst actuator 27 which is already in its left-hand position makes no change in the valve assembly 20. Movement of valve 22 as described enables pressure fluid from pump 18 to pass by pipe 28, valve assembly 19, and pipe 30 to the motor 14 which thereupon oscillates the table 11 and impeller 10 in a clockwise direction about axis d until the second impeller blade of the pocket being machined is brought into engagement with the cutter. This occurs simultaneously with the piston of motor 14 reaching the limit of its travel. The pressure of the system is again built-up and the sequence of operations already outlined above is followed through with the final result that the valve 22 remains stationary, so that pressure fluid continues to pass to motor 14 to maintain the impeller against inadvertent movement about axis d, whilst valve 23 of assembly 20 is moved by actuator 26 to its right-hand position so that pressure fluid passes from the pump by pipes 49 and 31 to the motor 16. This results in the impeller being swung about axis e so that the surface of the second impeller blade is machined by the cutter. When cutter 13 engages the back shroud the piston of motor 16 will have reached the limit of its travel, and as a consequence a pressure increase in the fluid system will be produced which results in the sequence of operations outlined above being repeated.

Whilst the cutter is moving around the periphery of the outer pocket the in-feed movement is continuously advancing the impeller towards the cutter. The peripheral and in-feed movements are stopped when the outer pocket has been completely machined. The impeller 10 is then removed from the machine shown in Figure 7 and mounted in the machine shown in Figure 8 so that the inner pocket may now be produced.

The fluid system of the machine shown in Figure 8 is identical with that shown in Figure 7 and in these two figures like parts are indicated by like numerals.

Referring to Figure 8: the impeller 10 is mounted upon a table 11 which is carried by a workhead generally indicated at 12. As stated above the inner pocket is formed by moving the cutter relatively to the impeller in a circumferential and radial direction. To allow for this the table 11 is rotatable about axis f in order to provide the circumferential movement referred to, and the head 12 is reciprocatable along slide 53 in order to provide for the radial movement. The circumferential movement is performed by motor 14 oscillating table 11 and the reciprocating motion of the head 12 by motor 16.

Carried by workhead 12 is a laminar pattern 54 which is reciprocated with the impeller. Co-operating with the pattern is a tracer pin 55 which is associated with the cutter 13. The outline of the pattern has the shape shown in Figure 6 and corresponds with the cross-sectional shape in a radial plane of the inner pocket which is to be produced by the machining operation. The tracer pin 55 is maintained stationary whilst the pattern 54 is moved relatively thereto, the arrangement being that upon the pattern engaging the tracer pin the oscillating or reciprocating movement of the impeller is stopped.

The operation of the machine is substantially the same as already described with reference to Figure 7 and accordingly this will now only be briefly outlined.

Let it be assumed that the cutter 13 is in engagement with the impeller at the point $h$ (see Figure 5) and is about to trace around the triangular path $h$, $j$, $i$, $h$. The disposition of the various parts of the mechanism at the commencement of this movement is shown in Figure 8. Pressure fluid from the pump 18 passes to the right hand end of the motor 14 and to the left-hand end of the motor 16, the former motor being at the end of its clockwise stroke as seen from above in Figure 8 and the latter motor being prevented from feeding the work further to the right in Figure 8 by the tracer 55 engaging the pattern 54. The pressure rises in both motors and the pilot valves 36 and 40 are opened so that pressure fluid passes to the actuators 27 and 24 so as to displace the valve 23 to its other setting and maintain the valve 22 in the setting shown. The valve 23 then admits pressure fluid to the left-hand end of the motor 14 which oscillates the work counterclockwise as seen from above about the axis $f$ which is coincident with that of the cutter. When the motor 14 has completed its stroke, the fluid pressure in both motors again rises to the predetermined value at which it opens the pilot valves 36 and 38. The valve 36 admits pressure fluid to the actuator 27 to maintain the valve 23 in its existing setting, i. e., the opposite to that shown, while the valve 38 admits pressure fluid to the actuator 25 which adjusts the valve 22 to its opposite setting to that shown. Pressure fluid from pump 18 passes by pipe 28, assembly 19, and pipe 29 to motor 16. At the same time pressure fluid passes by pipe 49, assembly 20 and pipe 32 to motor 14 to prevent inadvertent oscillating movement of the impeller. When during the reciprocating movement pattern 54 engages with the tracer pin 55 the piston of the motor 16 is no longer capable of movement and accordingly the pressure of the fluid system is raised. When this attains the predetermined value already referred to pilot valves 35, 38 are opened so that pressure fluid may pass to actuators 25, 26. Actuator 26 displaces valve 23 and permits the pressure fluid to pass from pipe 49 to pipe 31. The transmission of pressure fluid to actuator 25 has no effect and accordingly motor 16 will maintain a pressure tending to move the head 12 towards the left in the direction of arrow $g$. This however is prevented by the engagement of the tracer pin 55 with the pattern 54.

Motor 14 therefore rotates table 11 about axis $f$ so that the cutter moves circumferentially over the work until point $i$ is reached (see Figure 5) when the motor 14 reaches the end of its stroke which prevents further movement. The pressure increase which results, on being transmitted to pilot valves 35, 40, opens these and permits the pressure fluid to pass to the actuators 24, 26. Actuator 24 places valve 22 so that pressure fluid from pump 18 passes by pipe 30 to motor 16. The pressure fluid passing to the actuator 26 produces no change in the setting of the valve 23.

When the motor 16 has completed this reciprocating movement the cutter will have returned to its starting point $h$ at which point the tracer pin will engage with the pattern and prevent further movement in the direction $g$. The increase in fluid pressure which results from this engagement is transmitted to the pilot valves and actuators so that the work is again oscillated about the axis $f$ with which the cutter is now coincident. The sequence of operations outlined above is then repeated.

As the cutter is advanced into the work the tracer 55 moves into the pattern 54 and the extent to which the work is moved to the right in Figure 8 by the motor 16 is reduced. The travel of the cutter to the left relatively to the work is thus reduced so that it will not reach the axis $f$ and will move along a path concentric with the axis $f$ when the work is next oscillated about the axis $f$. The cutter will thus produce the surface $k$ shown in Figure 6 of which the shape in a radial plane is determined by that of the pattern.

It will be clear from the above descriptions of the operation of Figures 7 and 8 that during the first machining operation the movement of the impeller by motors 14 and 16 is of constant magnitude throughout the operation. It is thus possible to provide fixed limits for each such movement. As already indicated the limit of the movement is reached when the piston of the motors 14 and 16 have completed their travel. During the second machining operation the movement of the impeller in the radial direction constantly diminishes during the machining operation, being greatest at the commencement of the operation and a minimum at the end thereof. Accordingly it is impossible to provide the fixed stops in the radial direction as in Figure 7 and instead the pattern 54 and tracer 55 are provided.

To enable manual adjustment of the impeller relative to the cutter to take place whilst mounting the impeller on the machine, hand valve 48 is provided. This valve is capable of placing pipe 29 in communication with pipe 30. When this is done in the machine shown in Figure 7 the two sides of the piston of motor 14 are placed in communication so that manual oscillation of the table 11 can take place since fluid displaced from one side of the piston passes to the other. At the same time the head 12 can be freely swung by hand since the one side of piston of motor 16 communicates by pipe 31 or 32 and valve assembly 20 with one of the discharge pipes leading from the assembly, whilst the other side of the piston communicates by pipe 31 or 32, valve assembly 20, pipes 49, 28, valve assembly 19, pipes 29 or 30, with one of the discharge pipes leading from the assembly 19. A similar state of affairs is produced when the valve 48 of Figure 8 is set in the open position.

It is preferred that the machines described with reference to Figures 7 and 8 be operated by oil under pressure since this enables heavier loads to be transmitted. Nevertheless, the machines may be operated by compressed air.

In certain circumstances it may be found desirable to eliminate springs 46 from the pilot valves of the machines described with reference to Figures 7 and 8 since unless these are of considerable length they have a tendency to break. With this end in view pump 18 may pass pressure fluid to a valve 50 which permits high pressure fluid to pass by pipes 28, 49 to the valve assemblies 19, 20. This valve incorporates a reducing valve 51 which ensures that the pump also delivers low pressure fluid by a pipe line 52 which leads to the upper surface of the plunger 45 of each of the pilot valves. Build up of pressure above the plungers is prevented by leakage past them to the drain 56. The plunger of each pilot valve is maintained in its closed position by the low pressure fluid which constantly acts on the upper surface of the plunger. The liquid displaced by the upward movement of one plunger is displaced into the space left by the downward movement of another plunger which occurs concurrently once the cycle of operations has been initiated. Thus the valve 22 as shown in Figure 8 connects the pipes 28 and 34, so that high pressure acts underneath the plunger of the valve 36 to raise it, and connects the pipe 33 to a drain 57 so that the low pressure on top of the valve 35 holds it down. When the valve 22 is moved to its opposite setting, it connects the pipes 28 and 33 and the pipes 57 and 34. High pressure thus acts under the plunger in the valve 35 to raise it while the plunger in the valve 36 has no pressure under it so that the low pressure above it moves it down.

We claim:

1. A machine tool comprising a cutter, a work-support, a reversible fluid motor arranged to move the work-support relatively to the cutter in one direction, a second reversible fluid motor arranged to move the work-support relatively to the cutter in a direction transverse to said first direction, means limiting the extent of movement of the work-support relatively to the cutter in each direction, a source of fluid under pressure, a separate control valve controlling the admission of pressure fluid from said source to each motor and operable to reverse the direction of action of that motor, and four pilot valves, one for each direction of action of each motor, each subjected to the fluid pressure within the associated motor actuating that motor in the associated direction and, in opposition thereto, by a constant load in excess of the pressure in the associated motor when that motor is moving the work-support relatively to the cutter in the associated direction and each arranged to be actuated by a rise in the pressure to which it is subjected above said constant load to actuate the control valve associated with the other motor to reverse the direction of action of that motor.

2. A machine tool comprising a cutter, a work-support movable relatively to the cutter in two directions transverse to one another, two reversible fluid motors operatively connected to the work-support to move it relatively to the cutter in the two said directions respectively, means limiting the extent of movement in each direction, a source of fluid under pressure, a separate control valve for each motor which in one setting admits pressure fluid from said source to its motor to cause it to act in one direction and in another setting admits fluid to that motor to cause it to act in the reverse direction, two fluid pressure actuators for each control valve one of which is connected to the valve to move it to one setting and the other is connected to the valve to move it to the other setting, a separate pilot valve for each actuator operable to admit pressure fluid to its actuator and thereby bring an associated motor into action in an associated direction, a separate connection from each control valve to the two pilot valves associated with the other control valve by which one or the other pilot valve, depending on the setting of the control valve, is subjected to fluid pressure from the said source tending to open it and means applying a constant load to each pilot valve, tending to close it, in excess of the fluid pressure in either motor when it is moving the work-support relatively to the cutter.

3. A machine tool according to claim 2, wherein the means applying a constant load to each pilot valve subjects that valve to fluid pressure less than that required to actuate either motor.

4. A machine tool according to claim 2, wherein the means applying a constant load to each pilot valve comprises a connection from that valve to the source of fluid and a reducing valve in that connection.

5. A machine tool comprising a cutter, a work-support mounted to move relatively to the cutter in two directions transverse to one another, two double-acting piston and cylinder motors which are connected to the work-support to move it relatively to the cutter in said two directions respectively, a source of fluid under pressure, a separate control valve for each motor which, in one setting, admits fluid from the source to one end of its motor cylinder and, in a second setting admits fluid from the source to the other end of the motor cylinder to reverse its direction of action and which are arranged for adjustment from one setting to the other by fluid pressure, four pilot valves associated one with each setting of each control valve and arranged each, when open, to admit fluid from the source to the associated control valve to move it to the associated setting, connections from each pair of pilot valves associated with one control valve to the opposite ends, respectively, of the motor cylinder associated with the other control valve by which each pilot valve is subjected to the fluid pressure in one end of one motor cylinder in the direction to open the valve, and means applying a constant load to each pilot valve to close it which load is greater than the pressure required to actuate either motor but is less than the pressure built up in either motor when it reaches the end of its stroke.

6. A machine tool according to claim 5, comprising a pattern and a follower cooperating with the pattern, which pattern and follower are mounted for relative movement parallel to one of the directions of movement of the work-support relatively to the cutter and to move relatively to one another to an extent corresponding to the movement of the work-support relatively to the cutter in said direction.

JOHN THOMAS BOLAS.
RAYMOND WILLIAM EDWARDS.